Figure 1:
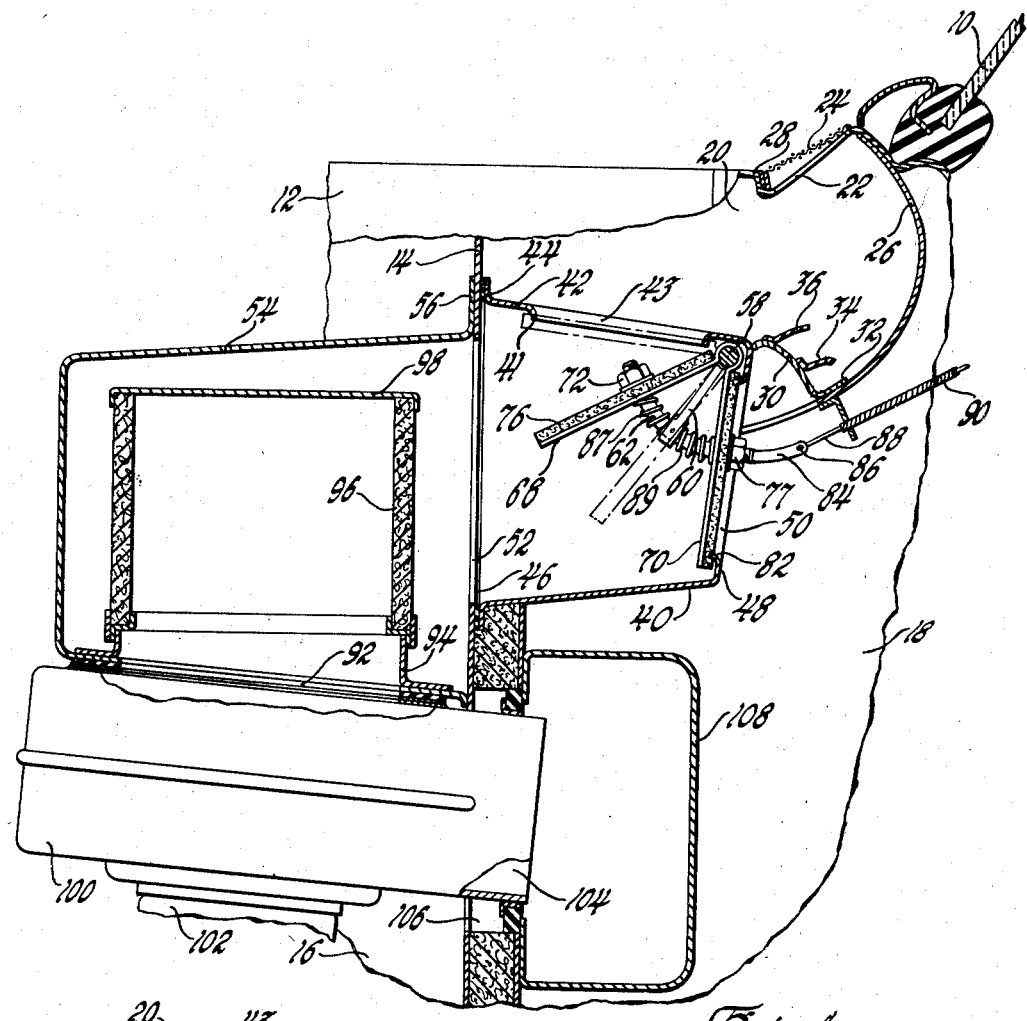

May 20, 1958

D. D. MILLER ET AL 2,835,183

VEHICLE AIR CIRCULATING SYSTEM

Filed April 9, 1956

INVENTORS
Donald D. Miller &
BY Gilbert H. Wolf

J.W. Lovett

ATTORNEY

United States Patent Office 2,835,183
Patented May 20, 1958

2,835,183

VEHICLE AIR CIRCULATING SYSTEM

Donald D. Miller, Pontiac, and Gilbert H. Wolf, Milford, Mich., assignors to General Motors Corporation, Detroit, Mich., a corporation of Delaware Application April 9, 1956, Serial No. 577,018

7 Claims. (Cl. 98—2)

This invention relates to air circulating systems for vehicles and more particularly to air circulating systems for introducing outside air and also recirculating air through passenger compartments of vehicles.

In systems for modifying the heat content of air in vehicle passenger compartments it has heretofore often been expedient and necessary to recirculate air to secure more efficient performance in the interest of windshield defogging and enhancement of passenger comfort. A recent development including this feature is disclosed in the United States application Serial No. 478,958, filed December 31, 1954, in the name of Maurice A. Thorne and entitled "Air Heating and Cooling Apparatus for Vehicles." With such systems difficulty has arisen in that the ram effect of air, particularly during high speed operation of a given vehicle, is sufficient to cause the control valves in the air circulation system to so operate as to defeat their purpose and function. It has been found that if the ram effect is such as to force a valve open or to overcome the effect of a blower, there is likelihood of outside air being guided directly into the passenger compartment to the discomfort of the passengers. The blower, of course, ordinarily operates to cause outside air to pass through a filter, heater or evaporator core before the air is introduced into the passenger compartment. It may be used only for ventilation in which event direct introduction of outside air is objectionable as it would carry dust and perhaps moisture with it. If the ram effect is too great, therefore, the blower and heater, cooler core and/or filter will be circumvented by the incoming air because of a recirculating air valve as heretofore used under certain conditions and control of the air circulation system is lost.

An object of the present invention is to provide an air circulating system with a valve arrangement control preventing excessive air pressures due to ram effect from effecting circumvention of the system despite a provision for recirculating air. Another object of the invention is to provide an improved air circulating system in which air may be recirculated through the passenger compartment while automatically avoiding the direct introduction of outside air into that compartment.

To these ends, a feature of the present invention is a housing having two valves resiliently controlled with one of those valves being set for predetermined maximum opening when the other valve is open.

This and other important features of the invention will now be described in detail in the specification and then pointed out more particularly in the appended claims.

Figure 2:
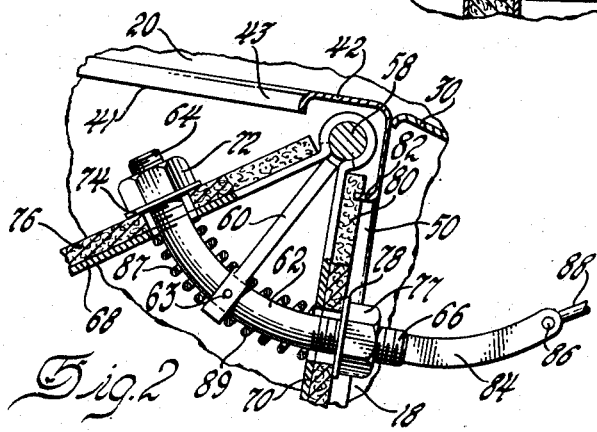

In the drawings:

Fig. 1 is a sectional view taken through the fire wall and cowl of an automotive vehicle and illustrating one embodiment of the present invention; and Fig. 2 is an enlarged and fragmentary view in section of valves as mounted in the structure of Fig. 1.

The vehicle partially depicted in Fig. 1, comprises the base of a windshield 10, a hood 12, a fire wall 14, an engine compartment 16 and a passenger compartment 18. Near the base of the windshield 10 and extending transversely across the vehicle body is an outside air inlet duct 20. This duct is closed at its ends and is of sufficient length to receive outside air, adequate for ventilation purposes, by ram effect through a grille 22 concealed by an ornamental screen 24. This screen is not only made attractive in appearance but also serves to prevent the admission of foreign objects. The air inlet duct 20 is defined by an arcuate rear wall 26 which is an integral part of the vehicle body, a horizontal wall 28 which extends beneath the hood 12, the fire wall 14, and a curved strip 30 bearing three upwardly and rearwardly directed flanges 32, 34 and 36. The flange 32 is fastened in fluid tight relation to the arcuate wall 26 and the other end of the curved wall 30 is tightly joined to a housing 40 the upper wall 42 of which is sheet metal which extends the full length of the air inlet duct 20. The forward margin of the wall 42 is upwardly flanged as at 44 to make a fluid tight joint with the fire wall 14, a gasket 46 being interposed. A downturned flange 41 is formed in the wall 42 to define a circular opening 43.

The housing 40, except for its extended wall 42, is not as long as the air inlet duct 20 and, in fact, it is made in the instant construction of such dimensions as are sufficient to accommodate a valve structure to be described hereinafter. The housing 40 is defined by a rear wall 48 which intersects with the wall 42 and bears an opening 50 communicating with the passenger compartment 18. The housing 40 also communicates by means of an opening 52 cut in the fire wall 14 with a housing 54 mounted in the engine compartment 16. This housing is flanged as at 56 and is suitably attached to the forward side of the fire wall 14.

Mounted within the housing 40 and transversely placed at the upper rear interior thereof is a fixed pin 58 upon which is freely pivoted a lever 60. This lever carries at one end an arcuate member 62 having straight threaded ends 64 and 66. These ends pass through two valves 68 and 70 respectively. The lever 60 and member 62 are fixed together by means of a pin 63. The lever 60 and the valves 68 and 70 are coaxially mounted for independent rotation on the pin 58 in a manner similar to the parts of a hinge on a door. The end 64 of the arcuate member 62 is provided with stop means comprising a nut 72 and a washer 74. The washer is adapted to contact a valve facing material 76 of such dimensions as properly to engage the flange 41 for closing the opening 43. The end 66 of the member 62 is provided with a nut 77 cooperating with a washer 78 adapted to engage a valve facing material 80 fixed to the valve 70. The facing 80 is adapted to seat on a flange 82 defining the opening 50. The end 66 is also provided with an arcuate extension 84 pivotally connected as at 86 to a Bowden wire 88. This wire constitutes means for actuating the lever 60 and the member 62, as will further appear, and it is guided in a conduit 90 to a position on the instrument panel of the vehicle so that a button may be provided for convenient manipulation by an operator.

Coiled springs 87 and 89 are retained on the arcuate member 62 and serve to hold the lever 60 between the valves 68 and 70 because of the compressive force placed on them by proper adjustment of the nuts 72 and 77.

The bottom wall of the housing 54 is provided with an opening 92 around the margin of which is fixed a flanged member 94 supporting a cylindrical filter 96. Tightly engaging the top end of the filter 96 is a metal cover 98.

Communicating with the housing opening 92 is the inlet of a blower 100, the latter having a motor 102. The outlet duct of the blower is indicated at 104 and this communicates through an opening 106 in the fire wall with a distributor manifold 108. The latter serves in actual construction to distribute the air to devices for modifying the heat content of the air as a preliminary to forcing that air into the passenger compartment 18. It will be appreciated, insofar as mere air circulation is concerned, that the manifold 108 may be omitted and the air may be forced directly into the passenger compartment. In some broad aspects the present disclosure is similar to that in the copending application S. N. 478,958.

Assuming that outside air is to be admitted into the compartment 18 and no air from that compartment is to be recirculated, the valves are then placed in the position shown in Fig. 1. The spring 89 will yield permitting proper closure of the valve 70. Air will enter through the grille 22 and into the air inlet duct 20. The valve 68 being open, air will enter the port 43, pass through the housing 40, and be filtered by the filter 96 before passing through the blower 100 and into the passenger compartment 18. Any water entering the grille 22 will be separated from the air by the baffles 34 and 36 and that water may be removed from the system by suitable drains at the ends of the duct 20. Dust will be removed from the air by the filter 96.

Assuming that all outside air is to be cut off from the passenger compartment, the valves 68 and 70 may be placed in the positions as shown by the dot-and-dash lines in Fig. 1. This is performed by rotating the arcuate member 62 by means of the Bowden wire 88. The lever 60 serves to support the member and to prevent it from twisting out of position. When the facing material 76 seats upon the flange 41, the coil spring 87 yields so that no critical adjustment is necessary to ensure proper seating. In the meanwhile the valve 70 is held in its open position because of the action of the stop means comprising the nut 77 and the washer 78. If desired, the blower 100 may be operated to recirculate air through the passenger compartment without use of any outside air from the air inlet duct 20.

Assuming that outside air is to be admitted and heated or otherwise treated with recirculated air as disclosed in the application Serial No. 478,958 heretofore referred to, the Bowden wire 88 will be pushed or pulled by the operator to cause the valves 68 and 70 to be open. Outside air will pass through the port 43 and be forced by the blower 100 into the passenger compartment. This air will subsequently be recirculated by its passing through the port 50 and mixing with freshly introduced outside air. Regardless of the speed of the vehicle or the extent of the ram effect, air will not pass through the port 43 and around the valve 68 for direct introduction into the compartment 18 by way of the port 50 as the valve 68 is preset to prevent such an occurrence. The aforementioned presetting consists in adjusting the valve 68 so that the pressure of impact or ram air from the outside of the vehicle is not greater than the suction pressure of the blower 100. The angle between the two valves or the maximum opening of the valve 68, when the valve 70 is open to any degree, is preset. Once this presetting is arrived at in a given vehicle it is possible to secure any percentage of outside air to inside air desired. When 100 percent outside air is desired, it is possible for the impact air pressure to nearly equal the effect of the blower so that the blower motor need not be used at high vehicle speeds. The spring 87 will resist the force exerted by excessive air pressure due to ram effect. The resistance of the spring in this regard may be adjusted by means of the nut 72.

From the above, it may be seen that the angular distance between the valves 68 and 70 is critical in any given installation when the valve 70 is open. When ram effect is the greatest the compression of the spring 87 is adjusted to retain or preset that angle so that a maximum opening of the valve 68 is not exceeded by air pressure exerted thereon. The spring 87 also prevents opening of the valve 68 from its closed position by ram effect. The preset positioning of the valves is critical as stated above, but the loading of the springs is not critical even though they should not be overcome by the ram effect. It is to be noted that it is always possible to open either valve and encroach upon the present angle between the valves because, if the wire 88 is pulled or pushed, a coil spring will be compressed when its corresponding valve is closed. Obviously, the control wire 88 must hold the valves in their selected positions. Various expedients to this end may be employed but are not depicted herein as they do not form a part of the present invention. The wire may be held in any selected axial position as by a detent arrangement or it may be held manually, but however held the action of the preset valve is automatic in preventing direct flow of air from the opening 43 to the opening 50 against the flow induced by the blower 100.

It will be understood that when the desired setting is determined for a particular model of vehicle the stop nuts 72 and 77 may be replaced by shoulder elements which are not adjustable on the member 62. This would be in the interest of quantity production.

Another variation is possible with the pivoted valves arrangement. The element 62 may be of rectangular cross section to prevent its twisting from position and it may be loosely supported on the valves thereby eliminating the need for the lever 60. In such case one spring could take the place of the two springs 87 and 89 and operation from the Bowden wire 88 may be through a lever connected to a shaft supporting the two valves. Rotation of the shaft may be transferred to each valve by a stop for opening that valve. A single spring taking the place of the springs 87 and 89 would serve to urge or bias the two valves against their stops.

We claim:

1. An air circulating system for a vehicle having a passenger compartment, said system comprising an outside air inlet duct, a blower and a housing connecting said inlet duct to the inlet of said blower, said blower being arranged to draw air through said duct and housing and discharge it into said said compartment, said housing having a first opening communicating with said duct and a second opening communicating with said compartment, a first valve and a second valve controlling said first and second openings respectively, and operating means connected to said valves including resilient means maintaining a predetermined maximum opening for said first valve when said second valve is open.

2. An air circulating system for a vehicle having a passenger compartment, said system comprising an outside air inlet duct, a blower and a housing connecting said inlet duct to the inlet of said blower, said housing being located between said duct and blower, said blower being arranged to draw air through said duct and housing and discharge it into said compartment, said housing having intersecting walls, one of said walls having a first opening communicating with said duct, the other of said walls having a second opening communicating with said compartment, a first valve and a second valve controlling said first and second openings respectively and being rotatable on a common axis, and operating means connected to said valves including resilient means maintaining a preset angle between said valves when the latter are open.

3. An air circulating system for a vehicle having a passenger compartment, said system comprising an outside air inlet duct, a blower and a housing connecting the said inlet duct to the inlet of said blower, said blower being arranged to draw air through said duct and housing in series and discharge it into said compartment, said housing having a first opening communicating directly with said duct and a second opening communicating with said compartment, a first valve and a second valve controlling said first and second openings respectively, and operating means connected to said valves including resilient means maintaining said second valve closed while actuating said first valve.

4. An air circulating system for a vehicle having a passenger compartment, said system comprising an outside air inlet duct, a blower and a housing connecting said inlet duct to the inlet of said blower, said blower being arranged to draw air from said duct and housing and discharge it into said compartment, said housing having a first opening communicating with said duct and a second opening communicating with said compartment, a first valve and a second valve controlling said first and second openings respectively, operating means resiliently connected to said valves and including an actuating lever, said valves having a definite setting with respect to said lever, and the said setting of said valves being such that when said second valve is open said first valve is open an extent less than a predetermined maximum thereby preventing at all times the direct flow of air from said duct to said second opening against the inductive action of said blower.

5. An air circulating system for a vehicle having a passenger compartment, said system comprising an outside air inlet duct, a blower and a housing connecting said inlet duct to the inlet of said blower, said housing being located between said duct and said blower, said blower being arranged to draw air from said duct and housing in series and discharge it into said compartment, said housing having two intersecting walls, one of said walls having a first opening communicating with said duct, the second of said walls having a second opening communicating with said compartment, a first valve and a second valve controlling said first and second openings respectively and being mounted for movement on a common axis, operating means for said valves and including a lever with one end mounted on a single axis with said valves for coaxial movement therewith, spring means interposed between the other end of said lever and each of said valves, and means for rotating said lever and thereby urging said valves toward closed and open positions.

6. An air circulating system for a vehicle having a passenger compartment, said system comprising an outside air inlet duct, a blower and a housing connecting the said inlet duct to the inlet of said blower, said blower being arranged to draw air through said duct and housing and discharge it into said compartment, said housing being located between said duct and said blower and having a first opening communicating with said duct and a second opening communicating with said passenger compartment, a first valve and a second valve mounted for rotation on a common axis in said housing to control said first and second openings respectively, an actuating lever mounted coaxially with and between said valves and movable between said valves, an arcuate member fixed to one end of said lever, stop means on said member adapted to engage said valves, and coil springs retained by said member and interposed between said lever and said valves.

7. An air circulating system for a vehicle having a passenger compartment, said system comprising an outside air inlet duct, a blower and a housing connecting the said inlet duct to the said blower, said blower being arranged to draw outside air from said duct and through said housing and discharge it into said compartment, said housing having a first opening for receiving said outside air from said duct and a second opening leading to said compartment, a first valve and a second valve controlling said first and second openings respectively, said valves being pivotally mounted between adjacent portions of said housing which define said openings, and operating means for said valves including spring means effective to maintain a maximum opening for said first valve at any open position of said second valve.

References Cited in the file of this patent

UNITED STATES PATENTS

| | | |
|---|---|---|
| 2,147,906 | Lintern | Feb. 21, 1939 |
| 2,220,355 | Shurtleff | Nov. 5, 1940 |
| 2,225,071 | Meyerhoeffer | Dec. 17, 1940 |
| 2,284,161 | McElgin | May 26, 1942 |
| 2,287,215 | Williams | June 23, 1942 |